United States Patent
Kovarik et al.

(10) Patent No.: US 7,813,491 B2
(45) Date of Patent: *Oct. 12, 2010

(54) AIN QUERY REDIRECTION

(75) Inventors: James D. Kovarik, Batavia, IL (US); Duane M. Figurski, Fox River Grove, IL (US)

(73) Assignee: AT&T Intellectual Property I L.P., Reno, NV (US)

(*) Notice: Subject to any disclaimer, the term of this patent is extended or adjusted under 35 U.S.C. 154(b) by 1835 days.

This patent is subject to a terminal disclaimer.

(21) Appl. No.: 10/804,376

(22) Filed: Mar. 18, 2004

(65) Prior Publication Data

US 2004/0177348 A1   Sep. 9, 2004

Related U.S. Application Data

(63) Continuation of application No. 10/025,004, filed on Dec. 18, 2001, now Pat. No. 6,731,743.

(51) Int. Cl.
*H04M 7/00* (2006.01)

(52) U.S. Cl. .................. 379/221.09; 379/220.01; 379/219

(58) Field of Classification Search ............ 379/221.09, 379/220.01, 219
See application file for complete search history.

(56) References Cited

U.S. PATENT DOCUMENTS

| | | | |
|---|---|---|---|
| 5,664,102 A | 9/1997 | Faynberg | |
| 5,703,940 A | 12/1997 | Sattar et al. | |
| 5,878,224 A | 3/1999 | Smith | |
| 5,915,008 A | 6/1999 | Dulman | |
| 5,930,348 A | 7/1999 | Regnier et al. | |
| 5,958,016 A | 9/1999 | Chang et al. | |
| 5,974,128 A | 10/1999 | Urban et al. | |
| 5,982,867 A | 11/1999 | Urban et al. | |
| 6,098,094 A | 8/2000 | Barnhouse et al. | |
| 6,108,409 A | 8/2000 | Cooper et al. | |
| 6,160,876 A | 12/2000 | Moss et al. | |
| 6,201,856 B1 | 3/2001 | Orwick et al. | |
| 6,282,280 B1 | 8/2001 | Rekieta et al. | |
| 6,560,327 B1 | 5/2003 | McConnell | |
| 6,731,743 B2 | 5/2004 | Kovarik et al. | |

*Primary Examiner*—Curtis Kuntz
*Assistant Examiner*—Karen L Le
(74) *Attorney, Agent, or Firm*—Hanley, Flight & Zimmerman, LLC

(57) ABSTRACT

A method of AIN query redirection is performed by a first SCP in a telecommunication network. The first SCP receives a query from an originating SSP and determines that a second SCP should service the query. The query is then populated with information from the originating SSP as well as appropriate routing information to send the query to a second SCP where a response is generated by the second SCP. The query response is sent back from the second SCP to the originating SSP without passing through the first SCP.

4 Claims, 3 Drawing Sheets

AIN QUERY REDIRECTION

RELATED APPLICATIONS

This patent arises from a continuation of U.S. application Ser. No. 10/025,004, now U.S. Pat. No. 6,731,743, which was filed Dec. 18, 2001. The foregoing patent is hereby incorporated by reference.

FIELD OF THE INVENTION

This invention relates generally to Advanced Intelligent Network (AIN) telephone services. More particularly, this invention relates to AIN query redirection.

BACKGROUND OF THE INVENTION

The Advanced Intelligent Network (AIN) is the name given to a collection of network elements including Service Switching Points (SSP's), Signal Transfer Points (STP's), Signal Control Points (SCP's), Intelligent Peripherals (IP's), Service Management Systems (SMS's), and Signaling System 7 (SS7) links. SS7, also known as Common Channel Signaling (CCS), provides AIN systems with out-of-band signaling system capability. Such out-of-band signaling systems provide separate channels for control messages. The SS7 exchanges control messages such as Transaction Capability Application Part (TCAP) messages, also called queries, between network elements to deploy selected services. The SS7 system also carries ISDN-user part (ISUP) messages between network node switching units to set up and route calls. The SS7 system handles queries and messages on a separate shared system from the trunks which carry customer call traffic.

AIN systems process queries based on information stored in various components of the AIN system. Currently, information relating to specific services and to specific customers can be contained in multiple and separate databases spread through the AIN system. When a query is sent from an originating SSP to a STP and from there to a SCP for processing, the SCP the query was sent to may not have the data locally available to be able to process the query. The first SCP would then send the query back to the STP from where the query would then be routed to a second SCP. Once the query is directed to the second SCP that contains the correct information to process the query, the query response is then sent back to the STP and from there to the first SCP before being sent back to the STP and from there to the originating SSP. This return path wastes both time and resources. Passing the query response back through the first SCP requires additional signals in the SS7 network. Additional signals create an increased burden on the SS7 network and also increases the overall elapsed time between when the original query was sent and the query response is received.

Another method of query handling used by AIN systems is to define translation type numbers (TTNs) and the 10 digit telephone number the TTNs correspond to in translation data tables (TDTs). These TDTs are contained in the SSP as well as in the STP that is designated to receive queries from that telephone number. Once the STP receives a query containing a TTN and 10 digit telephone number, the TTN and 10 digit telephone number are compared with the STP's TDTs. If both the TTN and the 10 digit telephone number are defined in the STP's TDTs, the STP can send the query, along with the data for processing the query, to the SCP. This method, however, requires a great deal of resources to define the additional TTNs and the corresponding 10 digit telephone numbers in both the SSP and STP TDTs. This method further requires a great deal of maintenance to keep the TDTs contained in the SSP and STP current and accurate.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
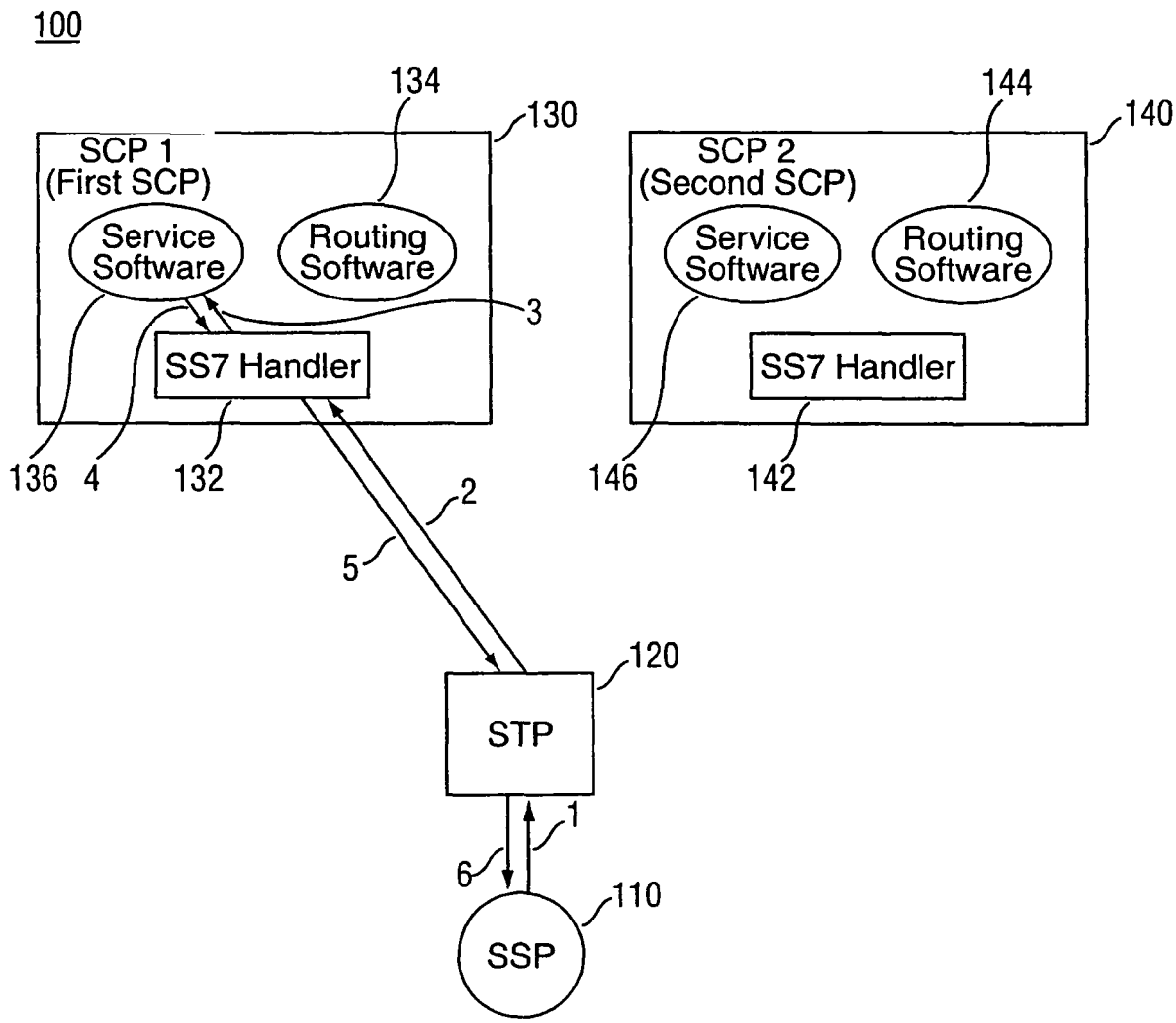
FIG. 1 is a block diagram of an AIN telephone system where an AIN query is not redirected.

FIG. 1 is a block diagram of an Advanced Intelligent Network (AIN) telephone system 100 where a query is not redirected. The AIN telephone system 100 shown includes a service switch point (SSP) 110, a service transfer point (STP) 120, a first service control point (SCP) 130, and a second SCP 140. An AIN telephone system 100 may contain fewer, more, and different components then listed above and still be considered an AIN telephone system 100. The SSP 110, STP 120, first SCP 130, and second SCP 140 can contain various components such as a computer processor, memory, modem, network interface card and the like to facilitate the reception of signals, the storage of data, the comparison of data, the creation of responses, the transmission of signals and the like. The SSP 110, STP 120, first SCP 130, and second SCP 140 can contain fewer, more and different components then those listed above.

The components of an AIN telephone system 100 are linked together in a network fashion according to a system of protocols known as signaling system seven (SS7). In an SS7 network, each component of an AIN telephone system 100 generally has a point code associated with it. The point code of a particular AIN telephone system component is similar to an address for that component on the SS7 network. Thereby, the point code is used by one component on a SS7 network to determine which other component on the SS7 network to send a signal to. Signals on the SS7 network, also called queries, modified queries, and query responses contain various layers of information to provide the SS7 network with information related to signal routing and signal content. A network component will use, and in some cases make changes to, information contained in a field, or layer, of a signal while the other layers and fields are merely relayed through that network component without being utilized and changed. The number and names of the various layers and fields in a signal varies from signal to signal but are generally standard in the AIN network 100.

Each signal on a SS7 network is assigned a unique transaction identification number by the sending component. This transaction identification number allows the SS7 network to track a signal. This tracking is accomplished by including the transaction identification number in a layer of the signal as well as the response to the signal.

The first SCP 130 includes an SS7 handler 132, routing software 134, and service software 136. The second SCP 140 includes an SS7 handler 142, routing software 144, and service software 146. The first SCP 130 and second SCP 140 can contain fewer, more and different components then those listed above.

An SS7 handler 132, 142 is a software package that has many functions including the tasks of tracking, packaging, and addressing queries. For example, the SS7 handler 132, 142 receives queries from an STP 120 and sends modified queries and query responses back to the STP 120. The SS7 handler 132, 142 compares a query with data input in the system. Based on this comparison, the SS7 handler 132, 142 can determine whether a query should be serviced locally or may be serviced by a different SCP. If the SS7 handler 132, 142 determines the query should be serviced locally, the SS7 handler sends the query to the service software 136, 146. The service software 136, 146 examines data contained in various layers of a query and processes the query to generate a query response based on the data found in the query and the data input in the system. However, if the SS7 handler 132, 142 determines the query may be serviced by a different SCP, the SS7 handler 132, 142 forwards the query to the routing software 134, 144 for further analysis. The routing software 134, 144 examines data contained in various layers of the query, and based on the comparison between the data found in the query and the data input in the system, the routing software determines where the query should be serviced.

In SS7 protocol, a signal, or in this case a query, is sent 1 from an originating SSP 110 to a STP 120 through the use of point code. The query is then received 1 at a STP 120 and the STP 120 performs a global title translation (GTT) on the query. A GTT allows the STP 120 to utilize information contained in the various layers of the query, such as the telephone number and translation type, to determine the destination for the query. The translation type, or translation number, defines a particular function and the related protocol for servicing a query. The query is then sent to a first SCP's 130 SS7 handler 132. The first SCP's 130 SS7 handler 132 analyzes the query to determine whether the query should be forwarded to the first SCP's routing software 134 or to the first SCP's service software 136.

If the first SCP's 130 SS7 handler 132 determines that the query should be serviced in the first SCP 130, the query is then sent 3 to the first SCP's 130 service software 136. The first SCP's 130 service software 136 would then process the query by generating an appropriate conversation and an appropriate response. This query response would then be sent 4 back to the first SCP's 130 SS7 handler 132. The first SCP's 130 SS7 handler 132 would then send 5 the query response to the STP 120. The STP 120 would then send 6 the query response to the originating SSP 110.

Figure 2:
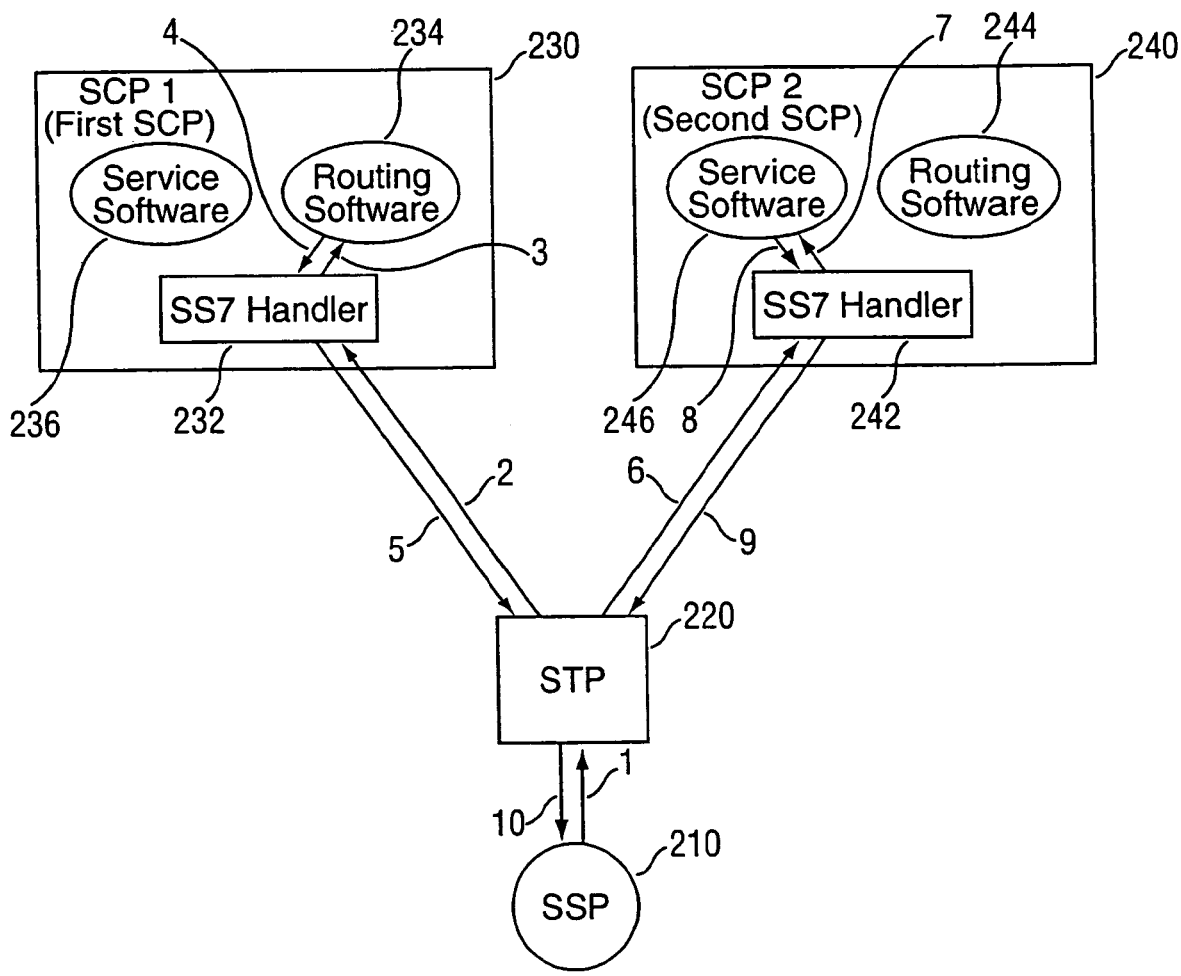
FIG. 2 is a block diagram of an AIN telephone system where an AIN query is redirected.

Referring now to FIG. 2 it shows a block diagram of an AIN telephone system 200 where a query is redirected. The AIN telephone system 200 shown includes a SSP 210, a STP 220, a first SCP 230, and a second SCP 240. An AIN telephone system 200 may contain fewer, more, and different components then listed above and still be an considered an AIN telephone system 200. The SSP 210, STP 220, first SCP 230, and second SCP 240 can contain various components such as a computer processor, memory, modem, network interface card and the like to facilitate the reception of signals, the storage of data, the comparison of data, the creation of responses, the transmission of signals and the like. The SSP 210, STP 220, first SCP 230, and second SCP 240 can contain fewer, more and different components then those listed above.

The first SCP includes an SS7 handler 232, routing software 234, and service software 236. The first SCP 230 can contain fewer, more and different components then those listed above. The second SCP includes an SS7 handler 242, routing software 244, and service software 246. The second SCP 240 can contain fewer, more and different components then those listed above.

In SS7 protocol, a signal, or in this case a query, is sent 1 from an originating SSP 210 to a STP 220 through the use of point code. The query is then received 1 at a STP 220. The STP 220 performs a GTT on the query and then sends 2 the query to a first SCP's 230 SS7 handler 232. The first SCP's 230 SS7 handler 232 then analyzes the query to determine whether the first SCP 230 should process the query.

If the first SCP's 230 SS7 handler 232 determines that the query should be serviced in the first SCP 230, the query is then sent to the first SCP's 230 service software 236. The first SCP's 230 service software 236 would then process the query and generate an appropriate conversation and an appropriate response. This query response would then be sent back to the first SCP's 230 SS7 handler 232. The first SCP's 230 SS7 handler 232 would then send the query response back to the STP 220. The STP 220 would then send the query response back to the originating SSP 210.

If the first SCP's 230 SS7 handler 232 determines that the query may be serviced in a second SCP 240, however, the first SCP's 230 SS7 handler 232 sends 3 the query to the first SCP's 230 routing software 234 for further analysis. The first SCP's 230 routing software 234 then analyzes the query to determine whether it should be serviced at the first SCP 230 or at a second SCP 240. If the first SCP's 230 routing software 234 determines the query should be serviced by the first SCP 230, the first SCP's 230 routing software 234 forwards the query to the first SCP's 230 service software 236 where the query is processed as described above.

However, if the first SCP's 230 routing software 234 determines the query should be handled at the second SCP 240, the first SCP's 230 routing software 234 populates the query with parameters from the originating SSP 210, parameters for the second SCP 240 and the query's forwarding indicator parameter is populated to "true."

Populating a query with parameters is the act of inserting parameters, including inserting specific values for parameters, into the query. A query's forwarding indicator parameter is a data field in a query that is set to "false" if the query was serviced locally and set to "true" if the query cannot be serviced locally.

Once the query has been populated, it is sent 4 back to the first SCP's 230 SS7 handler 232. The first SCP's 230 SS7 handler 232 checks the query to determine if the forwarding indicator parameter has been populated, or set, to "true." If the first SCP's 230 SS7 handler 232 determines the forwarding indicator has been set to "true," the SS7 handler 232 populates the query 4 with the originating SSP's 210 originating point code information and transaction identification obtained when the query was received by the first SCP's 230 SS7 handler 232.

The first SCP's 230 SS7 handler 232 then releases the internal transaction identification assigned by the first SCP 230 before sending 5 the query back to the STP 220.

Once the query arrives 5 back at the STP 220, a second GTT is performed on the query. The second GTT is performed because the query's originating point code information and transaction identification have been populated with the originating SSP's 210 information and a new translation type rather than with the first SCP's 230 information. This causes the STP 220 to interpret the query as having been sent from the originating SSP 210. The query is then sent 6 to the second SCP's 240 SS7 handler 242. When the second SCP's 240 SS7 handler 232 receives the query, the query appears as if it were an original query rather than a query that has passed through to the first SCP's 230 SS7 handler 232.

The second SCP's 240 SS7 handler 242 then analyzes the query to determine whether the second SCP 240 should service the query. If the second SCP's 240 SS7 handler 242 determines the query should be serviced locally, then the query is sent 7 to the second SCP's 240 service software 246. After the query is received 7 by the second SCP's 240 service software 246, the query is serviced. Servicing the query includes generating a conversation and a response for the query. The query response is sent 8 back to the second SCP's 240 SS7 handler 242. The second SCP's 240 SS7 handler 242 then sends 9 the query response back to the STP 220. The STP 220 then sends 10 the query response to the originating SSP 210. In this manner the query response has been sent from the second SCP 240 to the originating SSP 210 without passing through the first SCP 230.

Figure 3:
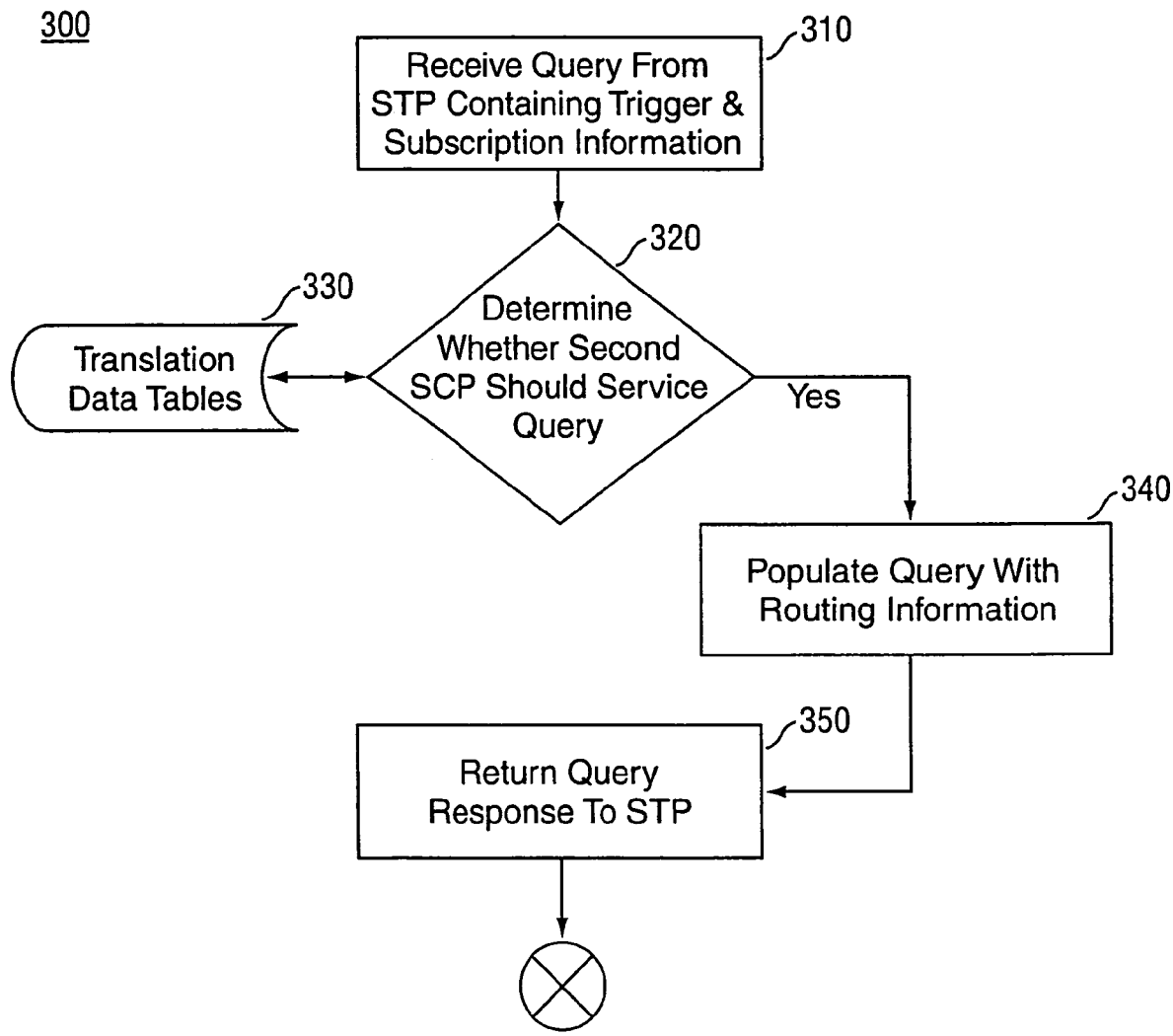
FIG. 3 is a flow chart of a method of AIN query redirection utilized in an AIN telephone system.

Turning now to FIG. 3 it shows a flow chart 300 of the decisions made by a first SCP. The first SCP receives 310 a query containing trigger information and subscription information from an STP, not shown, which had received the query from an originating SSP, not shown. Once a query containing trigger information and subscription information is received 310, the trigger information and subscription information is compared 330 with the data contained in Translation Data Tables (TDTs). When the trigger information and subscription information is compared 330 with the data contained in the TDTs the first SCP determines 320 whether the first SCP should service the query or a second SCP, not shown, should service the query. After a determination 320 is made that a second SCP, not shown, should service the query, the query is populated 340 with appropriate routing information from the TDTs. The modified query is sent 350 back to the STP not shown, and from the STP to the second SCP, not shown. The populating 340 of the query with the appropriate routing information allows the response to be returned from the second SCP to the STP and from there to the originating SSP without passing through the first SCP.

Various embodiments of the invention have been described and illustrated. However, the description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A non-transient computer readable medium having computer executable software code stored thereon for AIN query redirection by a first Service Control Point (SCP), the computer readable program code comprising:

a first computer readable program code configured for execution from the computer readable medium on a computer for receiving from a Service Transfer Point (STP) a query generated by an originating service switch point (SSP) containing trigger information and subscription information;

a second computer readable program code configured for execution from the computer readable medium on a computer for determining, based on a comparison between the query and information contained in Translation Data Tables (TDTs), that a second SCP should service the query;

a third computer readable program code configured for execution from the computer readable medium on a computer for populating the query with appropriate routing information for the second SCP as well as information from the originating SSP, and sending the modified query back to the STP to be sent on to the second SCP; and a fourth computer readable program code configured for execution from the computer readable medium on a computer for generating a query response at the second SCP and returning the query response to the STP and from there to the originating SSP without passing the query response through the first SCP.

2. The computer executable software code of claim 1, further comprising computer readable program code configured so that, when the computer readable code is executed from the computer readable medium on a computer, populating the query comprises populating the query with parameters from the originating SSP, populating the query with parameters for the second SCP obtained from a comparison between the query and information contained in the first SCP's translation data tables (TDTs), and populating a forwarding indicator parameter to "true."

3. The computer executable software code of claim 1, further comprising computer readable program code configured so that, when the computer readable code is executed from the computer readable medium on a computer, populating the query comprises determining a forwarding indicator is set to "true," populating an originating point code with the originating SSP's information, populating a translation type with the originating SSP's information, populating a transaction identification with the originating SSP's information, and releasing an internal transaction identification assigned by the first SCP.

4. A non-transient computer readable medium having computer executable software code stored thereon for AIN query redirection by a first Service Control Point (SCP), the computer readable program code comprising:

a first computer readable program code configured for execution from the computer readable medium on a computer for sending a query from an originating service switch point (SSP);

a second computer readable program code configured for execution from the computer readable medium on a computer for receiving the query at a signal transfer point (STP), performing a global title translation (GTT) on the query, and sending the query to the first SCP's signaling system seven (SS7) handler;

a third computer readable program code configured for execution from the computer readable medium on a computer for receiving the query at the first SCP's SS7 handler, analyzing the query to determine whether the first SCP should process the query, determining the query may be serviced at a second SCP, and sending the query to the first SCP's routing software:

a fourth computer readable program code configured for execution from the computer readable medium on a computer for receiving the query at the first SCP's routing software, populating the query with parameters from the originating SSP, populating the query with parameters for the second SCP obtained from a comparison between the query and information contained in the first SCP's translation data tables (TDTs), populating a forwarding indicator parameter to "true," and sending the query back to the first SCP's SS7 handler;

a fifth computer readable program code configured for execution from the computer readable medium on a computer for receiving the query back at the first SCP's SS7 handler and determining the forwarding indicator is set to "true," populating an originating point code with the originating SSP's information, populating a translation type with the originating SSP's information, populating a transaction identification with the originating SSP's information, releasing an internal transaction identification assigned by the first SCP, and sending a modified query back to the STP;

a sixth computer readable program code configured for execution from the computer readable medium on a computer for receiving the modified query at the STP, performing a second GTT on the modified query, and sending the modified query to the second SCP's SS7 handler;

a seventh computer readable program code configured for execution from the computer readable medium on a computer for receiving the modified query at the second SCP's SS7 handler, analyzing the modified query to determine whether the second SCP should process the modified query, determining the modified query may be serviced at the second SCP, and sending the modified query to the second SCP's service software;

an eighth computer readable program code configured for execution from the computer readable medium on a computer for receiving the modified query at the second SCP's service software processing the modified query, generating a conversation for the modified query, generating a response for the modified query, and sending the query response back to the second SCP's SS7 handler;

a ninth computer readable program code configured for execution from the computer readable medium on a computer for receiving the query response back at the second SCP's SS7 handler and sending the query response to the STP;

a tenth computer readable program code configured for execution from the computer readable medium on a computer for receiving the query response at the STP and sending the query response to the originating SSP; and an eleventh computer readable program code configured for execution from the computer readable medium on a computer for receiving the query response at the originating SSP without passing the query response through the first SCP.

* * * * *